United States Patent [19]
Bogese, II

[11] Patent Number: 5,692,925
[45] Date of Patent: Dec. 2, 1997

[54] MODULAR PLUG COMPRISING CIRCUIT ELEMENTS

[75] Inventor: Stephen B. Bogese, II, Roanoke, Va.

[73] Assignee: Virginia Patent Development Corporation, Roanoke, Va.

[21] Appl. No.: 479,794

[22] Filed: Jun. 7, 1995

Related U.S. Application Data

[63] Continuation of Ser. No. 405,451, Mar. 16, 1995, abandoned, which is a continuation of Ser. No. 283,254, Jul. 29, 1994, abandoned, which is a continuation of Ser. No. 172,869, Dec. 23, 1993, abandoned, which is a continuation of Ser. No. 59,880, May 11, 1993, abandoned, which is a continuation of Ser. No. 935,465, Aug. 27, 1992, abandoned, which is a continuation of Ser. No. 819,589, Jan. 9, 1992, abandoned, which is a continuation of Ser. No. 700,096, May 7, 1991, abandoned, which is a continuation of Ser. No. 566,895, Aug. 14, 1990, abandoned, which is a continuation of Ser. No. 443,859, Nov. 30, 1989, abandoned, which is a continuation of Ser. No. 338,331, Apr. 12, 1989, abandoned, which is a continuation of Ser. No. 201,316, May 27, 1988, abandoned, which is a continuation of Ser. No. 94,039, Aug. 27, 1987, abandoned, which is a continuation of Ser. No. 888,222, Jul. 23, 1986, abandoned.

[51] Int. Cl.[6] ............................... H01R 13/66
[52] U.S. Cl. ............................... 439/620; 379/21
[58] Field of Search ............................... 439/77, 78, 79, 439/620, 638, 676, 418, 425; 379/21, 30, 442, 443; 324/73 R, 158 R

[56] References Cited

U.S. PATENT DOCUMENTS

| | | | |
|---|---|---|---|
| 3,573,702 | 4/1971 | O'Keefe | 333/22 R |
| 3,850,497 | 11/1974 | Krumreich et al. | 339/126 R |
| 3,954,320 | 5/1976 | Hardesty | 339/99 R |
| 3,998,514 | 12/1976 | Hardesty | 339/99 R |
| 4,170,234 | 10/1979 | Graham | 439/525 |
| 4,368,363 | 1/1983 | Ahuja | 379/30 |
| 4,412,715 | 11/1983 | Bogese, II | 339/97 P |
| 4,600,810 | 7/1986 | Feldman et al. | 379/21 |

FOREIGN PATENT DOCUMENTS

| | | | |
|---|---|---|---|
| 691191 | 5/1953 | United Kingdom | 333/22 R |

*Primary Examiner*—Neil Abrams
*Attorney, Agent, or Firm*—Saidman DesignLaw Group

[57] ABSTRACT

A modular plug assembly for convenient interconnection, analysis, impedance matching or testing of computer, communication, local area network or other electronic equipment. The assembly comprises a plug of physical configuration generally similar to the modular plugs used for terminating cables. The plug contains all circuit elements required to apply one or more specified signals to contacts of a modular jack formed in the electronic equipment upon insertion thereinto of the modular plug of the invention. The circuit elements are formed on a flexible substrate which is entirely contained within the plug assembly. Contact between the circuit and the contacts of the jack on the equipment is provided by a number of terminals which are inserted into recesses formed in the body of the plug and retained therein. The terminals comprise tangs which pierce conductors formed on the circuit board and which comprise contact surfaces for contacting the contacts of the jack. The device may also comprise a lamp or other means for indicating the condition of the telephone or associated equipment being tested. The circuit may mimic electronic equipment to enable relocation of equipment in a local area network without reconfiguration of nodes of the network.

20 Claims, 5 Drawing Sheets

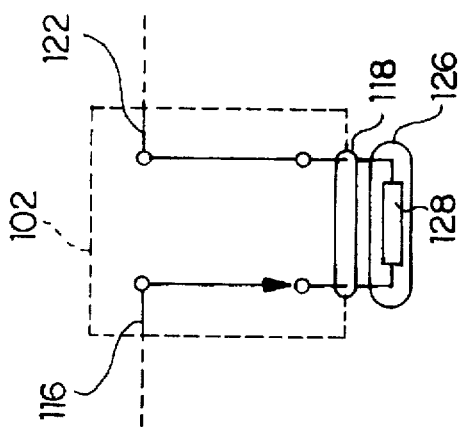
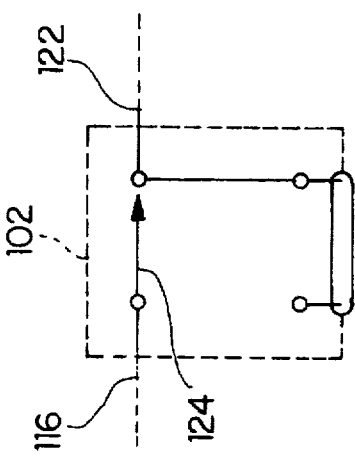
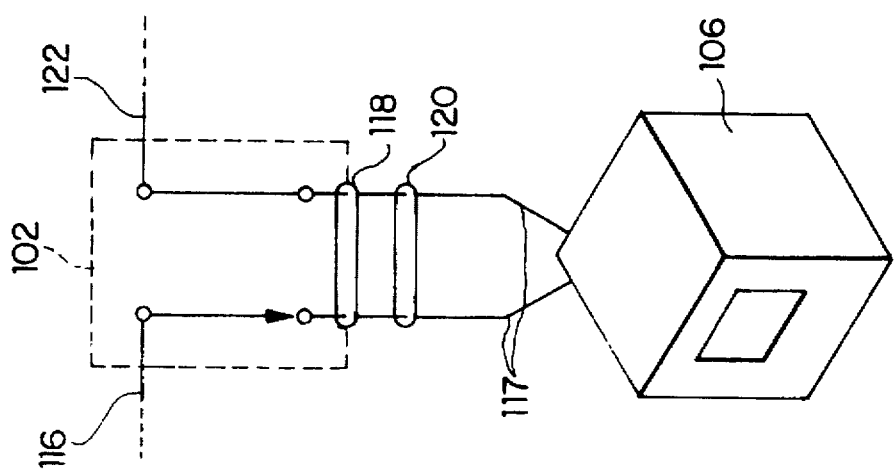

MODULAR PLUG COMPRISING CIRCUIT ELEMENTS

CROSS REFERENCE TO RELATED APPLICATIONS

This application is a continuation of Ser. No. 08/405,451 filed Mar. 16, 1995, now abandoned, which was a continuation of Ser. No. 08/283,254, filed Jul. 29, 1994, now abandoned, which was a continuation of Ser. No. 08/172,869, filed Dec. 23, 1993, now abandoned, which was a continuation of Ser. No. 08/059,880, filed May 11, 1993, now abandoned, which was a continuation of Ser. No. 07/935,465, filed Aug. 27, 1992, now abandoned, which was a continuation of Ser. No. 07/819,589, filed Jan. 9, 1992, now abandoned, which was a continuation of Ser. No. 07/700,096, filed May 7, 1991, now abandoned, which was a continuation of Ser. No. 07/566,895, filed Aug. 14, 1990, now abandoned, which was a continuation of Ser. No. 07/443,859, filed Nov. 30, 1989, now abandoned, which was a continuation of Ser. No. 07/338,331, filed Apr. 12, 1989, now abandoned, which was a continuation of Ser. No. 07/201,316, filed May 27, 1988, now abandoned, which was a continuation of Ser. No. 07/094,039, filed Aug. 27, 1987, now abandoned, which was a continuation of Ser. No. 06/888,222, filed Jul. 23, 1986, now abandoned.

BACKGROUND OF THE INVENTION

1. Field of the Invention

This invention relates to a device for the convenient interconnection, testing, or evaluation of computer, local area network, communications or related electronic equipment. More particularly, this invention relates to a modular plug which is adapted to be conveniently inserted into a conventional modular jack, and which comprises circuitry for being coupled to the various conductors in the jack in order to interconnect, evaluate or test associated equipment, which may include a wide variety of computer or other electronic equipment.

2. Description of Related Art

A wide variety of electronic equipment is commonly connected using modular plugs described in U.S. Pat. Nos. 3,954,320 and 3,998,514 to Hardesty. More particularly, the Hardesty type modular plugs are now generally used as terminating connectors for telephone cords, as well as in other more generalized cable interconnection applications. The modular plugs set forth in the Hardesty patents feature substantially planar contact terminals which terminate respective ones of a plurality of insulating conductors of the cord. The contact terminals include insulation-piercing tangs. When installed in the plug housing, the tangs pierce the conductors of a cable inserted into the body of the plug. The edges of the contact terminals opposite the tangs are exposed along a line at an outside wall of the plug, so as to mate with similarly spaced spring contacts of a mating modular jack. A suitable modular jack is described in U.S. Pat. No. 3,850,497, Krumreich et al. In this way, the conductors of the cable may be connected to the associated equipment.

U.S. Pat. No. 4,412,715, issued to me on Nov. 1, 1983, discloses a "Modular Electrical Plug Incorporating Conductive Path." One or more conductive paths are formed on a flexible plastic substrate, such that a printed circuit path results. The printed circuit path is positioned beneath the individual insulated conductors of a cable in a modular plug, such that when the tangs of the contact terminals of the modular plug pierce the insulated conductors, they also pierce the conductive path formed on the flexible substrate. In this way, the printed circuit path is connected to the conductors, and, when the modular plug is inserted into a modular jack, to the associated equipment. My previous patent discloses that the printed circuit path may include active circuit elements and may connect any of the cable's conductors with any of the contact terminals.

As mentioned, the equipment connected using such modular jacks and plugs may include a wide variety of electronic devices. In particular, local area network (LAN) components, including a variety of computer devices and associated equipment connected by a continuous cable so as to share resources, such as printers, data storage devices and the like, are typically connected using such modular plugs and jacks. Thus, LANs typically comprise a number of distributed computers or user terminals and associated equipment such as printers, modems, disk drives and the like disposed in various physical locations as convenient throughout an office or suite of offices. These system elements are connected by multiconductor cables which may be disposed within the walls of the building. Installation of a LAN thus typically involves the provision of a multiconductor cable connecting a number of jacks disposed on the surfaces of junction boxes mounted to the walls. The jacks and their cable connections are standardized, so that equipment can be moved around as needs change. The cable-connecting jacks in their junction boxes, together with any active or switching circuitry which may be included, are referred to as "nodes". As an alternative to adding new wiring, unused telephone wires can sometimes be adapted for use in LAN networks.

In many cases, the components of LANs communicate using a so-called "token-passing" scheme in which each of the system's devices in succession must pass a signal down the line. This requires continuity from one end of the LAN cable to the other; that is, either a device must be connected to each of the nodes or the contacts of the node's "upstream" and "downstream" cable connections must be bridged by jumper wires or the equivalent, such that the LAN cable is continuous from one end to the other. For this reason, when a computer device is moved from one node on a LAN to another, the vacated node must be modified such that the token signals pass therethrough without interruption. Typically this involves the setting of an internal switch or the like connecting the "upstream" cable connection of the node to the "downstream" cable connection. However, for a variety of reasons, this is not an intrinsically simple operation and generally requires a service call. Indeed, it is estimated that the cost of such an operation can be between eight and fifteen hundred dollars. This clearly limits the flexibility of the LAN, which should be one of its prime advantages.

Another difficulty is encountered in connection with the common practice described above of using pre-existing unused telephone wiring for interconnection of the computer devices making up the LAN. Telephone wiring in general is not designed with data communications in mind, and therefore there are typically impedance mismatches, which cause signal attenuation, and other problems which must be dealt with. This generally involves first characterizing the impedance characteristics of the wiring, and then correcting any problems noted. At present I am aware of no simple method of characterizing the signal transmission characteristics of the preexisting wiring, as is required for LAN installation, which is not unduly complex and expensive.

SUMMARY OF THE INVENTION

I have now realized that it would be possible to use the basic modular plug design disclosed in the Hardesty patents to provide a modular plug and circuit for interconnection, analysis and testing of a wide variety of electronic equipment. More particularly, my present invention includes a modular plug which is shaped in accordance with the teachings of the Hardesty et al. patents, so as to be readily plugged into a modular jack for connection to spring contacts therein, but in which all circuit elements required for the interconnection, analysis or testing are contained within the plug itself. In this way the plug does not need to be connected to any external circuitry whatsoever, whereby additional conductors or cables and associated equipment are not required.

More particularly, the modular plug of the present invention includes a circuit board in the form of a flexible substrate disposed entirely within the plug. Conductive paths formed on the flexible substrate are arranged to be pierced by contact terminals, in a manner similar to that by which connection is made to the insulated conductors in the Hardesty patents and in which connection is made between the conductors and conductive paths in my prior U.S. Pat. No. 4,412,715. In this way, the circuit board is very permanently retained in the plug, and the connection from the circuit board to the terminals is very simply, efficiently and sturdily made. A major difference between my present invention and the teaching of my '715 patent is that the modular plug of the present invention does not terminate a cable including a plurality of insulated conductors.

The invention also includes a method of making a modular plug which includes the steps of assembling a flexible circuit substrate having active circuit components and conductive paths thereon, inserting the substrate into a modular plug, and inserting a number of contact terminals into apertures in the body of the plug so as to pierce the conductive paths while leaving edges of the terminals exposed for contacting spring contacts carried by a mating modular jack. This method may also include potting the assembly with an epoxy or polyester resin or the like, such that a simple, durable, economical and compact assembly is provided which may nevertheless provide highly sophisticated circuit testing functions. Alternatively, the flexible substrate and the circuit components may be coated with a dielectric film or other protective material so as to prevent mechanical or static electrical damage to the circuit.

A number of uses for the plug as described above are within the scope of the invention. For example, the plug of the invention can be used in a LAN system to provide a through connection at vacant nodes. Thus, for example, when a user terminal is moved, vacating a node, at present one is typically obliged to engage a serviceman to reconfigure the node to allow communications to continue. The plug of the present invention may comprise circuitry designed to functionally mimic the absent computer device, that is, to provide the same signal transfer function as had the removed device. This avoids the necessity to reconfigure the node.

Circuitry comprised by the plug of the invention can also be used to measure the impedance at a particular connection so as to enable the system installer to optimize the impedance of the connecting device. The plug of the invention can also be used to provide additional impedance at a node so as to avoid signal reflection which is frequently a problem in installation of LANs. Finally, the plug of the invention can also be used to provide a reference impedance for use by a computer device which includes internal impedance matching circuitry. Other uses of the modular plug comprising circuit elements of the invention will occur to those of skill in the art.

BRIEF DESCRIPTION OF THE DRAWINGS

The invention will be better understood if reference is made to the accompanying drawings, in which:

FIG. 2 comprises FIGS. 2a–2c and shows respectively schematic depictions of the connection of a computer device to a node of a LAN system, the reconfiguration of the LAN node when the computer device is removed, and the manner in which the plug of the present invention eliminates the need for reconfiguration of the LAN node;

DESCRIPTION OF THE PREFERRED EMBODIMENTS

Figure 1:
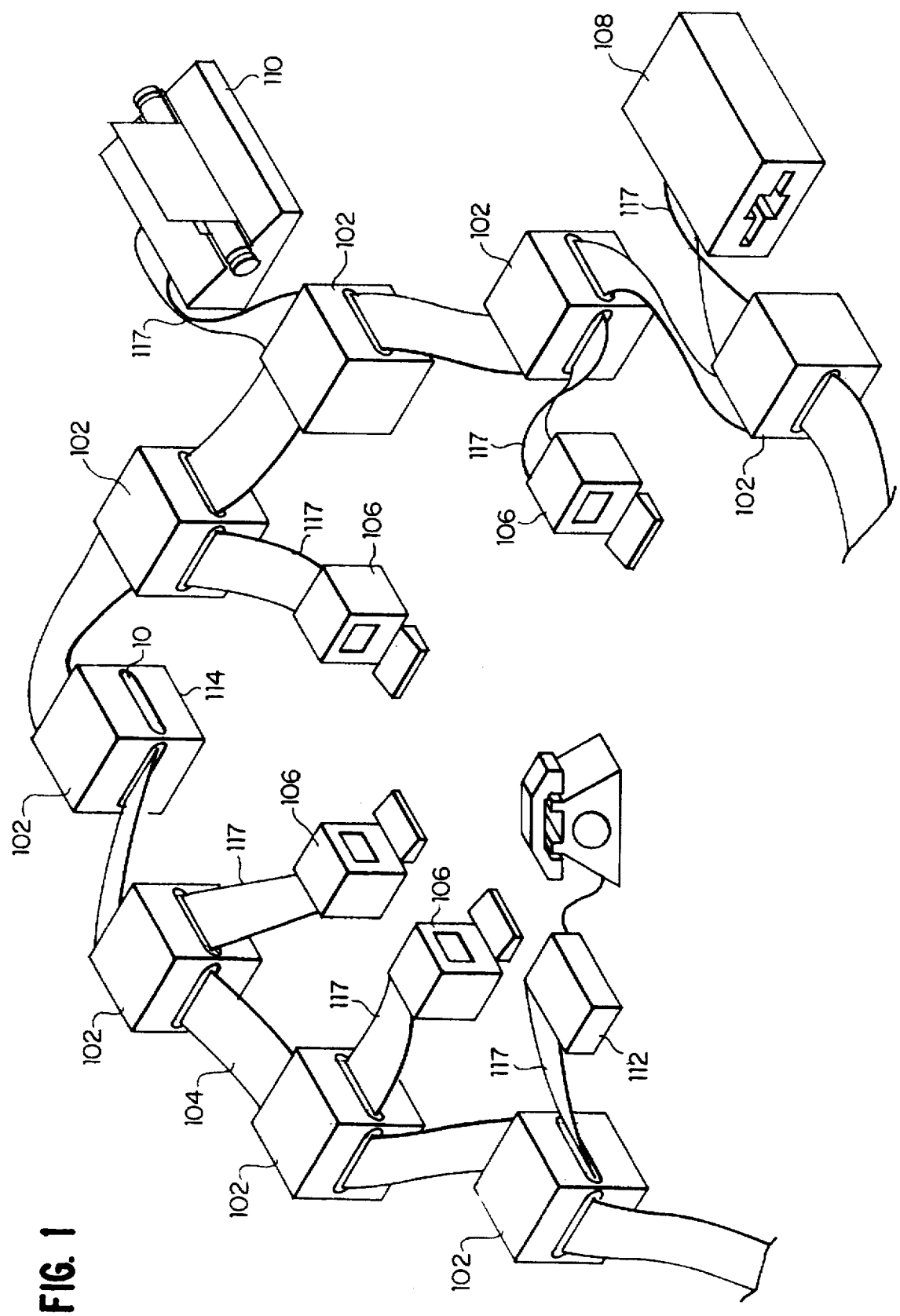
FIG. 1 shows a schematic depiction of a portion of a LAN system.

FIG. 1 shows in schematic form an exemplary Local Area Network or LAN system. The LAN system comprises a number of nodes 102, which are shown as junction boxes, and which are interconnected by cabling 104. Typically the boxes containing the nodes 102 will be mounted at convenient intervals around the walls of an office or office suite and be connected by cables 104 disposed within the walls. As mentioned, in many cases the cables 104 are previously installed telephone wiring.

To the nodes 102 are connected a variety of computer devices and peripheral equipment. Connection is typically made using multi-conductor cables 117 which are terminated by modular plugs (according to the Hardesty patents) plugged into modular jacks (according to the Krumreich patent) mounted on the boxes and wired to the circuitry of the node. The equipment thus connected may include user terminals 106, each comprising video display terminals and keyboards for user input, and peripheral devices such as data storage devices, as indicated by a disk drive shown at 108, output devices such as a printer shown at 110, and means for communication with other data processing equipment, such as a modem shown at 112, for communication over the lines of the telephone system. The terminals 106 may each comprise computing "intelligence" or may simply be terminals each accessing a shared control processing unit. In some cases, multiple elements of the equipment can be attached at a single node.

It will be appreciated that one node 114 is shown which has no data processing equipment connected to it. In typical LANs, when no equipment is attached to a given node, the node must be internally reconfigured so as to pass the token signal from an upstream cable connection to a downstream cable connection, in order that the LAN can function. That is, a continuous communication path must be provided; if a device is removed, continuity of the path is broken. Therefore the node must be reconfigured. As described above, such internal reconfiguration generally requires a costly service call. According to the invention, a modular plug 10 comprising circuitry for mimicking a component of the LAN, that is, for providing the same signal transfer function, is plugged into the vacated jack. In this way, the expense of the service call can be avoided in favor of a simple and inexpensive plug device.

FIG. 2 shows in highly schematic form one manner in which the plug according to the invention can mimic the computer equipment removed from the vacated node. In FIG. 2a there is shown a conventional connection of an item of data processing equipment, in this case a terminal 106, to the node indicated generally at 102. The connection of the terminal 106 to the node 102 is made by way of a cable 117, terminated by a modular plug 120, plugged into a modular jack 118, wired to the circuitry of the node.

As mentioned above, typically a LAN comprises a series of nodes which are connected together by cables 104 in a manner such that each of the nodes in turn must transmit a token-passive signal. As shown, the signal coming in on an incoming side of the mode, e.g., as shown at 116, is then passed by way of modular jack 118 to the computer device 106. The computer device then returns the signal or another signal which is to be sent. This signal is then passed through the modular plug 120 and the modular jack 118 toward the downstream side 122 of the LAN cable.

FIG. 2b shows schematically what is conventionally done when the computer device 106 is removed. An internal switch indicated at 124 is reset, such that the upstream side 116 of the LAN cable is now effectively connected to the downstream side 122. It will be appreciated by those skilled in the art that in this embodiment the signal passes through the node 102 is unchanged, which is the manner in which some LANs function. That is, the computer devices 106 only alter the received signal when a message is to be sent; otherwise the "token" simply passes along the length of the LAN. Other interconnections, and much more complex node circuitry, are also possible and these are within the scope of the invention as well. In effect, each node must provide a specified signal transfer characteristic if the LAN is to function.

FIG. 2c shows the process performed according to the present invention when the computer device 106 is removed from a node 102. In this case, the plug of the present invention is indicated at 126 and is plugged into the modular jack 118. The plug 126 contains a circuit 128 which functionally mimics the computer device 106. That is, the circuit does precisely what the computer device does when it does not alter the incoming signal. For example, in the simple case shown in FIG. 2b, where all that need be done to reconfigure a vacated node is to connect the incoming and outcoming terminals, the circuit 128 can simply be a jumper wire connnecting two terminals of the jack 118, thus passing the signal from the upstream side 116 to the downstream side 122 without alteration.

It will be appreciated by those skilled in the art that in many cases more than one wire may be comprised by the LAN cable and that therefore the schematic depiction of FIG. 2 is highly simplified for clarity. It will also be appreciated that in many cases the reconfiguration is more complicated than the mere throwing of a switch. Accordingly, the mimicking of the terminal by the modular plug according to the present invention may involve more than a simple connection of the terminals of the modular jack to one another. In effect the modular plug of the invention must provide the same signal transfer characteristics as had the element of computer equipment. The plug of the invention is therefore not to be limited to the specific embodiments shown, but includes the mimicking of all such signal transfer characteristics. For example, when the computer equipment simply passes the token signal through the node when it does not seek to send a data message, but does provide a given impedance to the passage of the signal, the circuit 128 may simply comprise an impedance-matching resistor.

Additional possible uses for the plug of the invention include functions such as impedance testing and matching. For example, various sorts of electronic equipment use modular jacks for interconnection. Such equipment includes telephone equipment, computer equipment, data communications equipment, LAN equipment and other forms of electronic equipment. The impedance of the various devices varies from type to type and possibly also by manufacturer. Connecting cables vary in impedance as well. In order that impedance-matching (to reduce signal reflection at the interfaces between the equipment and the cables) can be performed, the impedance of the various components must be measured. In some cases, the impedance may be conveniently tested by connection of a resistor across certain terminals of the equipment. In the prior art, as exemplified by my prior patent, a resistor or other circuit element could be incorporated into a plug used to terminate a cable. According to the present invention, no cable is required, and all test equipment required to be connected to the jack is incorporated within the plug itself, thus much simplifying the provision and use of the test equipment, rendering it substantially fool-proof and efficient, as well as compact and light in weight. Those skilled in the art will recognize that a wide variety of circuit testing functions are made possible by supplying the appropriate signals to appropriate ones of the terminals 18, and thence to the spring contacts of a modular jack.

Similarly, a wide variety of other functions useful in connection with LAN systems can readily be provided by circuitry located entirely within the modular plug according to my invention. Such other possibilities can include circuitry for measuring the amplitude of the signal and cutting it off if it falls below a minimum value, or alternatively amplifying it. Another possibility would be to use the plug according to the invention to provide a reference impedance to an impedance-matching circuit comprised by the computer equipment itself, which can then compare the reference impedance with the impedance of the LAN to which it is connected, for use in setting the parameters of an internal impedance matching network. Accordingly a wide variety of circuits and functions are considered to be within the scope of the present invention.

FIGS. 3 through 6 and the discussion thereof below detail the construction of the modular plug of the invention and its manufacture.

As described above, the present invention comprises a modular plug which is shaped and formed so as to interfit with a conventional modular jack, such that its outside dimensions and shape are generally as in the commercial equipment manufactured in accordance with the teachings of the two Hardesty patents described above, which are incorporated herein by reference.

Figure 3:
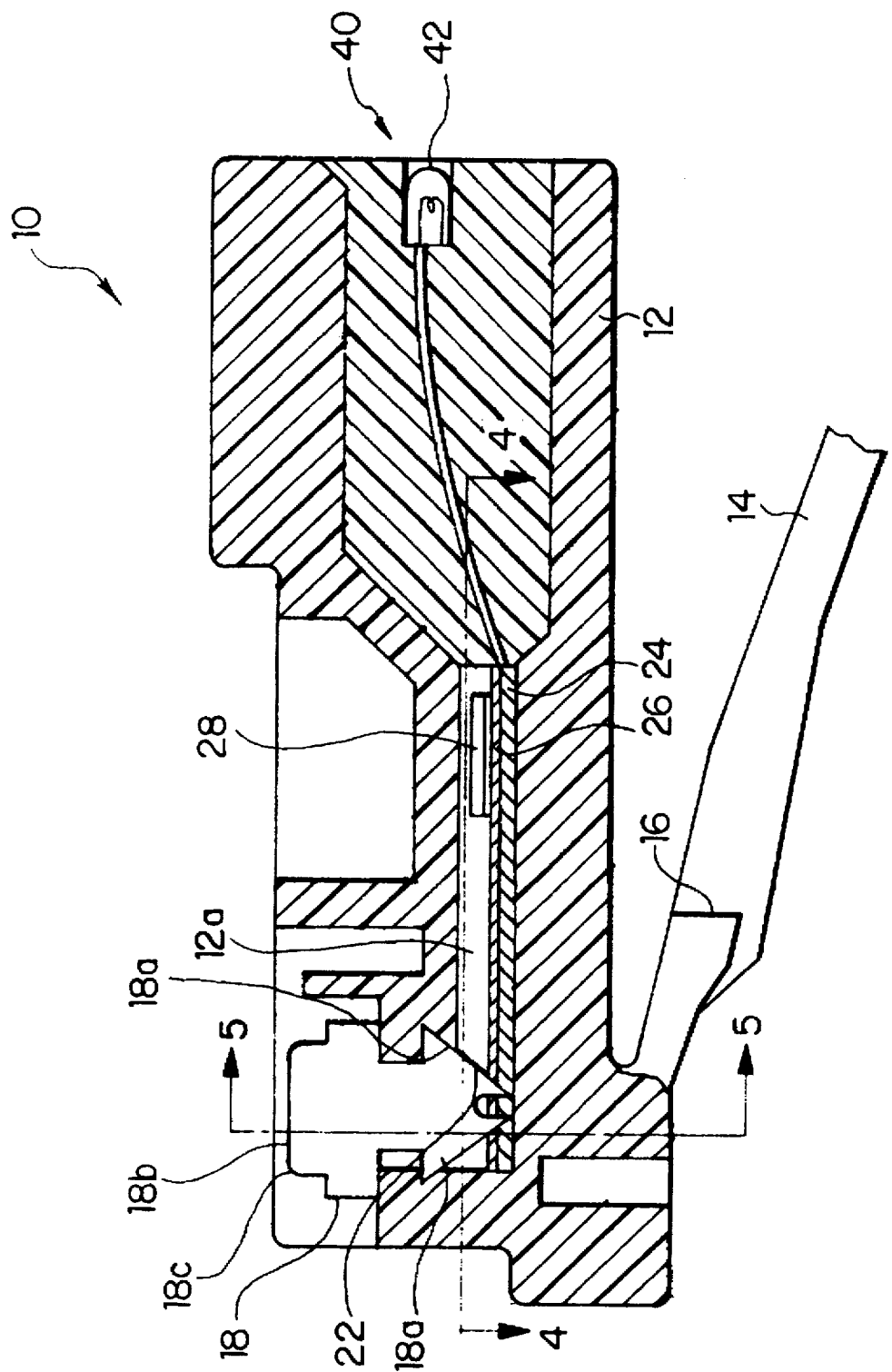
FIG. 3 shows a longitudinal cross-sectional view of a preferred embodiment of the modular test plug of the present invention.
Figure 4:
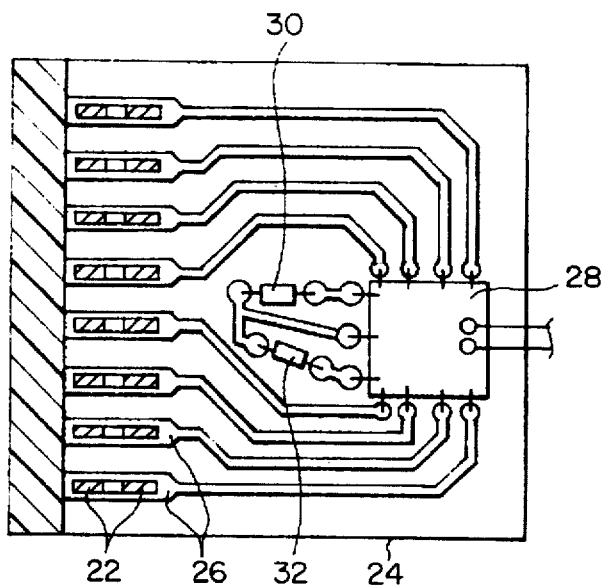
FIG. 4 shows a cross-sectional view taken along the line 4—4 of FIG. 3.
Figure 5:
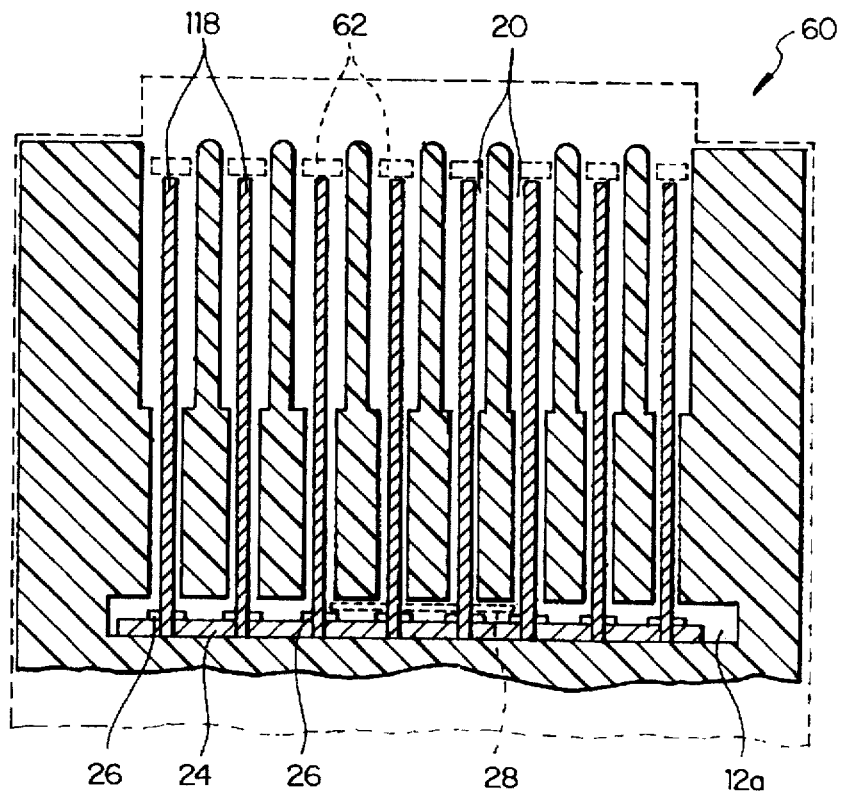
FIG. 5 shows a cross-sectional view taken along the line 5—5 of FIG. 3.

FIG. 3 shows a longitudinal sectional view of the overall configuration of such a modular plug, indicated generally at 10, and FIGS. 4 and 5 show cross-sectional views taken along lines 4—4 and 5—5 of FIG. 3 respectively.

As indicated, the modular plug 10 comprises a generally one piece or unipartite rigid dielectric housing 12, which comprises slots 20 for receiving contact terminals 18 (see FIG. 5) and a recess 12a for receiving a thin flexible substrate 24 having conductive paths 26 formed thereon. As seen in FIG. 5, lower floor 25 of recess 12a is preferably substantially flat (i.e., has no ribs or other wire guidance devices) so as to better accommodate substrate 24 thereon. Formed integrally with the housing 12 is a latching arm 14 having spaced shoulders 16 adapted to mate with similarly spaced recesses on a mating modular jack.

Flexible substrate 24 is sized to be a relatively close fit within the recess 12a, such that it is correctly located therein. The conductive paths 26 are formed to provide circuit connections required between individual electronic or electric circuit elements 28, 30, 32 which may comprise such things as integrated circuits, resistors, capacitors, batteries or other power sources, etc. which can be chosen as needed by those of skill in the art to provide suitable functions to associated equipment having a modular jack into which the modular plug of the invention is inserted.

The mating modular jack in the preferred embodiment is, as mentioned, generally as described in U.S. Pat. No. 3,850,497 in the name of Krumreich et al., incorporated herein by reference. It is shown in phantom at 60 of FIG. 5; it comprises a number of spring contacts 62 which as shown abut the terminals 18 of the plug of the present invention.

As described in my previous U.S. Pat. No. 4,412,715, incorporated herein by reference, the flexible substrate 24 may be formed of a thin plastic film, e.g. polyester film 0.0005–0.010" thick, sized so as to be a close fit into a cavity 12a formed in the body 12 of the plug 10. The conductive paths 26 may be formed on the upper or lower surface or both of the flexible substrate as desired, and may take any suitable geometry.

The pathways may comprise metallic conductors on the order of 0.001" thick, formed using any suitable technique.

In a presently preferred embodiment, the conductive paths are formed as follows. A Mylar (trademark DuPont Co.) substrate with an adhesive coating is applied to a thin metallic sheet. This is then masked to define the desired conductive paths, and etched to remove undesired conductive material, leaving the desired conductive paths.

Other techniques suitable for forming the conductive pathways are known to the art. For example, as described in my prior U.S. Pat. No. 4,412,715, a conductive ink which comprises metallic particles suspended in a binder has been found suitable for forming the conductive pathways 34. A suitable ink is Part No. Electrodag® 550 manufactured by Acheson Colloids Company. The conductive ink may be applied to the substrate using printing, silk-screening, masking or transfer processes. Any suitable technique is within the scope of the present invention. The components 28, 30, 32 are then assembled using techniques conventional in the art to complete the circuitry. Those skilled in the art will recognize that printing of circuit elements is also possible; resistors can be effectively formed by silk-screening, for example. Where only printable components are required, as in impedance-matching circuitry, this may be a desired mode of practice of the invention.

As seen in FIG. 3, a number of the planar contact terminals 18 are illustrated as extending through elongated slots 20 formed in the dielectric housing 12 of the plug 10. As shown, the tangs 22 of the terminals 18 extend through the conductive paths 26 and into the flexible substrate 24. The piercing of the paths 26 by the tangs 22 of terminals 18 ensures reliable electrical contact therebetween. Tabs 18a formed on the terminals 18 ensure their retention in the housing 12. As shown the terminals have upper edges 18b for mating with the spring contacts of the jack; one or both of the ends of the upper edge 18b may be rounded or chamfered as shown at 18c to provide a "crown" over which the spring contacts may slide smoothly. When the plug 10 is thereafter inserted into the jack 60 as described in the Krumreich et al. patent, reliable connection is made between the spring contacts of the jack and the associated circuitry 28, 30, 32, as illustrated in FIG. 3.

FIG. 3 also shows additional features of the invention. To ensure the durability and integrity of the plug assembly, the rearmost portion of the plug 10, which includes the opening through which the circuit is inserted, may be filled or potted as indicated at 40 with a suitable material, e.g., an epoxy or polyester resin. In this way, the interior of the plug 10 and the circuitry on flexible substrate 24 will be essentially protected from moisture and dust. Another possibility is to coat the conductive paths and circuit elements (preferably not including the portions of the conductive paths which the tangs pierce) with a dielectric coating prior to assembly into the body of the plug, in order to desensitize the circuit elements to electrostatic discharge. A material described as a "conformal coating", which is an ultraviolet-radiation curable polymer material available from W. R. Grace & Co., is suitable. Other materials are suitable and are within the scope of the invention; the function of the coating is to provide a dielectric barrier to prevent electrostatic and mechanical damage to the circuit elements, and any material which does so is suitable.

The opening through which the substrate and assembled circuit elements are inserted is that into which a cable is "normally" inserted, that is, when a plug having the same external configuation as the plug of the present invention is used (as in my prior patent) to terminate a cable. Use of the term "normally" in the claims appended hereto is meant to refer to such use of a plug for cable termination.

Another possibility is provision of an operator output device, such as a bulb as shown at 42. For example, assume that the test plug 10 is desired to check the power supplied to two contacts on modular jacks used in connection with a particular piece of equipment. Desirably, the plug should provide an output signal indicating to the operator that the equipment has satisfactorily passed the test. In this case, an LED or similar bulb 42, connected by way of conductive paths 26 formed on substrate 24 to appropriate terminals 18, can simply be lit, indicating to the operator that this particular piece of equipment has passed this particular test. In such case, the method of testing the invention involves but two steps: the operator need simply insert the plug, and see whether the bulb 42 lights. This is clearly a highly advantageous test, and is essentially foolproof.

Figure 6:
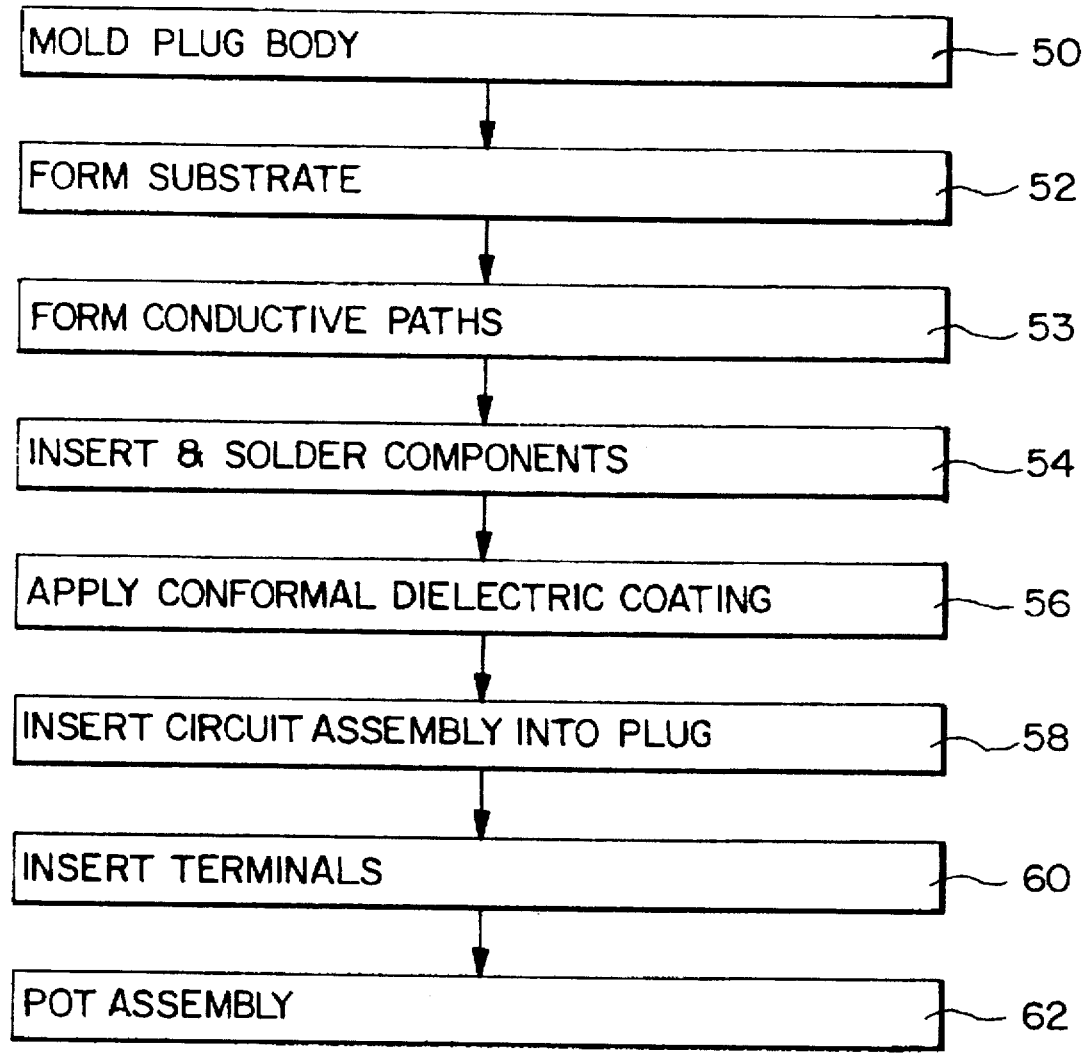
FIG. 6 outlines the steps in the manufacture of the modular plug of the present invention.

FIG. 6 shows in schematic form the steps required in manufacture of the modular test plug of the invention. At 50, the plug body is molded using conventional molding processes. At 52, the flexible substrate is fabricated. The conductive paths are formed on the substrate at 53 as described above. The circuitry is completed by insertion of the various components required and their permanent connection, typically by soldering, as noted at 54. The techniques used in this step are within the skill of the art. At this point the assembly of the substrate and the associated circuit components may be coated with a dielectric material, as indicated at 56. At 58, the flexible substrate is assembled into the body of the plug; at 60, the terminals 18 are inserted, piercing the paths 26 formed on the circuit board 24; and at 62, the circuit board may optionally be potted to ensure its durability in use.

While a preferred embodiment of the invention has been described with reference to the accompanying figures, the invention should not be limited thereby, but only by the accompanying claims. In particular, a full range of equivalents should be given to the circuit elements disclosed, inasmuch as it is envisioned that a wide variety of possible circuits for testing, interconnection, analysis, impedance matching, signal transformation, provision of reference impedance, and performance of other useful functions are within the scope of the invention. The invention is therefore to be measured only by the following claims.

I claim:

1. A telephone-style modular plug, which comprises:
    a dielectric housing having a first end for insertion into a mating modular jack, a resilient locking tab integrally connected by a flexible hinge to said first end of said dielectric housing and extending obliquely rearwardly therefrom, and a second end disposed at the opposite end to said first end and having a cavity therewithin for normally receiving a multi-conductor cord;
    a printed circuit located in said cavity of said housing, said printed circuit comprising a flexible substrate having at least one electrically conductive path thereon;
    said first end of said housing including side-by-side slots in communication with said cavity and electrically conductive substantially planar contact terminals positioned within said slots and extending into said cavity for making electrical engagement with said path on said substrate and for making electrical contact external to the plug;
    said contact terminals including tangs at the lower portion thereof normally adapted to make electrical contact with the conductors of the normally present multi-conductor cord, and a substantially flat upper edge surface on at least one end of which is formed a crown, said crown adapted to make electrical contact with spring contact portions of said mating modular jack when said plug is inserted into said jack;
    said cavity not having a multiconductor cord positioned therein; and
    means for preventing one or more of said conductors of a multiconductor cord from being positioned adjacent said slots so that said electrically conductive substantially planar contact terminals cannot make electrical contact with said one or more of said conductors of said multiconductor cord.

2. The modular plug as set forth in claim 1, wherein said cavity includes a lower floor upon which said substrate is located, said lower floor having no ribs, grooves, or other wire guidance structure thereon.

3. The modular plug as set forth in claim 2, wherein said lower floor is substantially planar.

4. The modular plug as set forth in claim 1, wherein said means for preventing one or more of said conductors of said multiconductor cord from being positioned adjacent said slots includes a physical barrier for preventing said multiconductor cord from being inserted into said cavity.

5. The modular plug as set forth in claim 1, further comprising circuit elements assembled to said substrate and connected to said electrically conductive path for applying signals to said contact terminals.

6. A telephone-style modular plug for normally terminating a multi-conductor cable and for making electrical contact external to the plug, which comprises:
    a dielectric housing having a first end adapted to be inserted into a telephone-style mating modular jack and a second end having a cavity, said cavity normally adapted to receive a multi-conductor cable;
    a plurality of electrically conductive contact terminals positioned in said housing and extending through said cavity, said contact terminals having tangs for normally making electrical engagement with the conductors of the normally present multi-conductor cable, said contact terminals also having an external surface for making electrical contact with spring contact wires of the mating modular jack; and
    a thin, flexible substrate having at least one electrically conductive path thereon, said substrate being positioned within said cavity to make electrical contact with said tangs of said contact terminals to provide an electrically conductive path within said housing between at least two of said contact terminals;
    said housing being devoid of a multi-conductor cable therewithin; and
    means for preventing said conductors of a multiconductor cable from making electrical contact with said plurality of electrically conductive contact terminals.

7. The modular plug as set forth in claim 6, wherein said cavity includes a lower floor upon which said substrate is located, said lower floor having no ribs, grooves, or other wire guidance structure thereon.

8. The modular plug as set forth in claim 7, wherein said lower floor is substantially planar.

9. The modular plug as set forth in claim 6, wherein said cavity includes a physical barrier for preventing said cable from being inserted therein.

10. The modular plug as set forth in claim 6, further comprising circuit elements assembled to said substrate and connected to said electrically conductive path for applying signals to said contact terminals.

11. A telephone-style modular plug for terminating an electrical component inside the plug and for making electrical contact external to the plug, which comprises:
    a dielectric housing having a first end adapted to be inserted into a telephone-style mating modular jack and a second end having a cavity, said cavity adapted to receive an electrical component, said cavity having a lower floor which has no wire guidance means thereon;
    a plurality of electrically conductive contact terminals positioned in said housing and extending through said cavity, said contact terminals having tangs for making electrical engagement with said electrical component, said contact terminals also having an external surface for making electrical contact with spring contact wires of the mating modular jack;
    wherein said electrical component comprises a thin, flexible substrate having at least one electrically conductive path thereon, said substrate being positioned within said cavity so as to make electrical contact with said tangs of said contact terminals to provide an electrically conductive path within said housing between at least two of said contact terminals; and
    means for preventing the conductors of a multiconductor cord, normally insertable into said housing, from being electrically engaged by said tangs.

12. The modular plug as set forth in claim 11, wherein said lower floor is substantially flat.

13. The modular plug as set forth in claim 11, wherein said housing is devoid of a multi-conductor cable therewithin.

14. The modular plug as set forth in claim 11, wherein housing includes a plurality of external walls and has no electrical cable extending from within said housing beyond any of said external walls.

15. The modular plug as set forth in claim 11, further comprising circuit elements assembled to said substrate and connected to said electrically conductive path for applying signals to said contact terminals.

16. A telephone-style modular plug for normally terminating a multi-conductor cable and for making electrical contact external to the plug, which comprises:
    a dielectric housing having a plurality of external walls, a first end adapted to be inserted into a telephone-style mating modular jack, and a second end having a cavity, said cavity normally adapted to receive a multiconductor cable;

a plurality of electrically conductive contact terminals positioned in said housing and extending through said cavity, said contact terminals having tangs for normally making electrical engagement with the conductors of the normally present multi-conductor cable, said contact terminals also having an external surface for making electrical contact with spring contact wires of the mating modular jack; and a thin, flexible substrate having at least one electrically conductive path thereon, said substrate being positioned within said cavity to make electrical contact with said tangs of said contact terminals to provide an electrically conductive path within said housing between at least two of said contact terminals;

said housing having no electrical cable extending beyond any of said external walls thereof; and means for preventing one or more of said conductors of a multiconductor cord from making electrical contact with said electrically conductive substantially planar contact terminals.

17. The modular plug as set forth in claim 16, wherein said cavity includes a lower floor upon which said substrate is located, said lower floor having no ribs, grooves, or other wire guidance structure thereon.

18. The modular plug as set forth in claim 17, wherein said lower floor is substantially planar.

19. The modular plug as set forth in claim 16, wherein said cavity includes a potting compound located therein for preventing said multi-conductor cable from being inserted into said cavity.

20. The modular plug as set forth in claim 16, further comprising circuit elements assembled to said substrate and connected to said electrically conductive path for applying signals to said contact terminals.

* * * * *